(12) United States Patent
Morimoto et al.

(10) Patent No.: US 7,010,564 B2
(45) Date of Patent: Mar. 7, 2006

(54) REGION CALCULATION METHOD, SPATIAL DATA MINING APPARATUS, GEOGRAPHICAL INFORMATION DISPLAY APPARATUS, SPATIAL DATA MINING SYSTEM AND STORAGE MEDIUM

(75) Inventors: Yasuhiko Morimoto, Yamato (JP); Shu Tezuka, Chigasaki (JP); Kazuyoshi Hidaka, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1244 days.

(21) Appl. No.: 09/840,333

(22) Filed: Apr. 23, 2001

(65) Prior Publication Data

US 2002/0059273 A1    May 16, 2002

(30) Foreign Application Priority Data

May 24, 2000  (JP) .............................. 2000-153087

(51) Int. Cl.
G06F 15/16    (2006.01)

(52) U.S. Cl. ...................................... 709/200; 707/100
(58) Field of Classification Search ................ 707/100; 709/200

See application file for complete search history.

(56) References Cited

U.S. PATENT DOCUMENTS

| | | | | |
|---|---|---|---|---|
| 5,988,853 A * | 11/1999 | Kim et al. | ..................... | 700/90 |
| 6,003,029 A * | 12/1999 | Agrawal et al. | ................ | 707/7 |
| 6,301,575 B1 * | 10/2001 | Chadha et al. | .................. | 707/2 |
| 6,307,965 B1 * | 10/2001 | Aggarwal et al. | .......... | 382/225 |
| 6,363,327 B1 * | 3/2002 | Wallet et al. | .................. | 702/11 |
| 6,393,149 B1 * | 5/2002 | Friederich et al. | .......... | 382/173 |
| 2001/0051947 A1 * | 12/2001 | Morimoto et al. | .......... | 707/100 |

FOREIGN PATENT DOCUMENTS

JP          10-240747          9/1998

OTHER PUBLICATIONS

Japan Patent Office office action sent Feb. 3, 2004 with English translation.
"Instinct Marketing—Information Visualization by Geographical Information System"; Nikkei Information Strategy, No. 51, May 22, 1996, pp. 134-145.

* cited by examiner

*Primary Examiner*—Bunjob Jaroenchonwanit
*Assistant Examiner*—Joseph Maniwang
(74) *Attorney, Agent, or Firm*—Whitham, Curtis & Christofferson, P.C.; Stephen C. Kaufman

(57) ABSTRACT

It is one object of the present invention to perform regional optimization while taking spatial continuity into account, and to provide higher-level spatial data mining.
[Constitution]

A region calculation method for introducing a two-dimensional association rule, extracted from a database, that includes spatial information, such as addresses, and for applying the two-dimensional association rule for a map, comprises the steps of: defining an objective function that is used to introduce the two-dimensional association rule and that does not include regional information for which an output request has been submitted; dividing a region on the map into pixel grids having a predetermined size to form buckets (S101); aggregating data available in the database for each bucket (S103); employing the objective function to calculate a region for the optimization of the objective function (S104); extracting entities, appearing on the map, that correspond to the obtained region (S106); and employing the extracted entities to output a region that is applied for the map.

18 Claims, 12 Drawing Sheets

(a) Customer database for specific department store

| Customer ID | Name | Address X , Y | Sales value | Annual income |
|---|---|---|---|---|
| 101 | ichiro | 100 , 150 | 126,800 | 5,000,000 |
| 102 | jiro | 220 , 180 | 198,000 | 7,000,000 |
| 103 | saburo | 420 , 500 | 15,000 | 5,800,000 |
| ⋮ | ⋮ | ⋮ | ⋮ | ⋮ |

(b) Limitation, objective function for optimization of region

| Limitation : | Objective function : |
|---|---|
| Maximum grid count | Sum of sales value |
| Minimum customer count | Average annual income |

Fig. 3

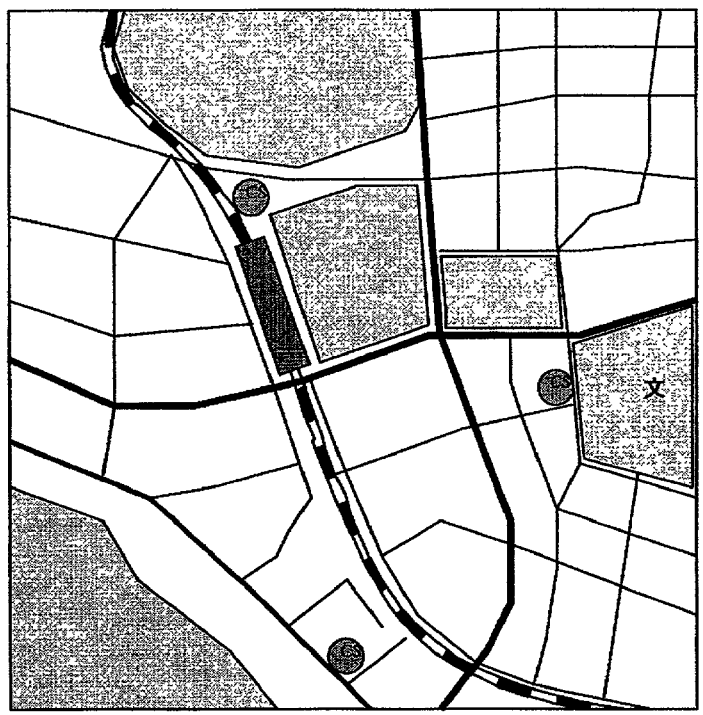
(a) Map
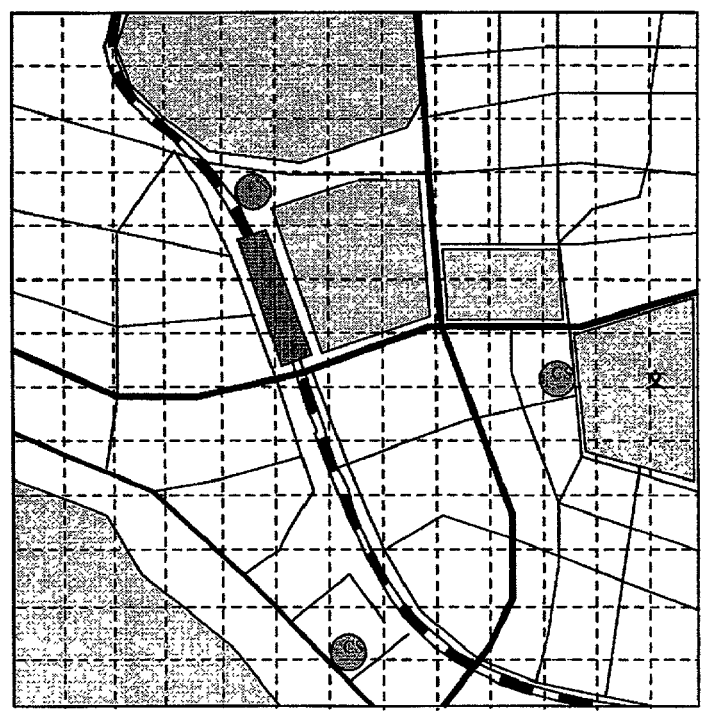
(b) Map buckets
Fig. 4

US 7,010,564 B2

REGION CALCULATION METHOD, SPATIAL DATA MINING APPARATUS, GEOGRAPHICAL INFORMATION DISPLAY APPARATUS, SPATIAL DATA MINING SYSTEM AND STORAGE MEDIUM

DETAILED DESCRIPTION OF THE INVENTION

1. Field of the Invention

The present invention relates to database processing for spatial data mining, and relates more specifically to a method and an apparatus for the calculation of an optimal region, which is the basic function of spatial data mining.

2. Background Art

A new processing technique has been introduced whereby spatial information, such as address data, in large databases can be interpreted by applying spatial context and spatial rules. But since present day spatial data mining requires expensive spatial/geometrical calculations involving a huge amount of data, and since extremely difficult technical problems are frequently encountered, spatial data mining has not been well studied and remains an underdeveloped field. However, spatial data mining is considered to be a feasible basic technique that can greatly assist in the development of databases capable of handling huge volumes of business data for the information industry or for the GIS (Geographical Information System) field. Spatial data mining, and associated techniques, is further considered to be a field having the potential to provide many benefits for businesses.

A database system that does not have a spatial analyzation function can only perform an aggregate operation that can be sorted in accordance with the attributes of the database. For example, if information concerning administrative districts is stored in a database, aggregate operations can only be performed for individual administrative districts. And likewise, if information concerning stores is stored in a database, aggregate operations can only be performed for individual stores.

Spatial analysis of data is indispensable for area marketing, for example, and the most advanced GIS available implements an integral calculation function performed using results provided by a spatial information calculation and results provided by a database calculation. That is, an integrated GIS stored on a database can be used to perform an operation employing calculation results, obtained using spatial information, for the aggregation of target attributes stored in a database, such as an aggregation operation performed for individual blocks defined by main streets or an aggregation operation performed for areas corresponding to the territories of individual stores.

The present applicant has proposed, in Japanese Patent Application No. Hei 09-034605 (U.S. Pat. No. 5,991,752), a technique for providing a rule for the integration of data to obtain a form that people can easily understand, and for the visualization of a number of integration rules to provide an expanded range of selections for users, thereby enabling individuals to select the integration rules they feel best suit their purposes.

[Problems to be Solved by the Invention]

As in the above example, the most advanced integrated GIS spatially aggregates data, and extracts the greatest aggregate value, so that data mining analyzation for the examination of a spatial feature or trend can, to a degree, be performed.

However, higher-level analyzation is desired for the future in spatial data mining field, and one of the analyzation processes is regional optimization. For example, for a sales strategy prepared for an expensive product, it is extremely important that information be acquired concerning the "region wherein the average annual income is maximized or minimized", or for an effective deployment system of police, an especially strong need exists for the acquisition of information concerning the "region wherein the crime rate is maximized". The above described conventional technique can be employed to calculate an aggregate value for each computable region and to extract the largest aggregate value. However, spatial continuity can not be taken into account by using the range provided for the application of the conventional technique. As a result, a spatial rule, as in the above example, can not be extracted for the obtained region, so that the conventional technique can not satisfactorily function as a future spatial data mining system.

To resolve the above shortcomings, it is one object of the present invention to perform regional optimization while taking spatial continuity into account, and to provide higher-level spatial data mining.

It is another object of the present invention to rapidly perform calculations for an optimal region.

It is an additional object of the present invention to adjust regional information so that it matches an actual geographical entity, and to output the obtained regional information with the map.

SUMMARY OF THE INVENTION

To achieve the above objects, according to the present invention, a two-dimensional association rule is obtained from a large database, which includes such spatial information as positional information, based on a limitation relative to an output region (e.g., a minimal or a maximal area or a minimal or a maximal population) and an objective function (e.g., the total sales of a specific product or the number of crimes committed), and the obtained rule is applied for a map. Specifically, according to one aspect of the present invention, a region w calculation method for introducing a two-dimensional association rule, extracted from a database, that includes spatial information, such as addresses, and for applying the two-dimensional association rule for a map, comprises the steps of: defining an objective function that is used to introduce the two-dimensional association rule and that does not include regional information for which an output request has been submitted; dividing a region on the map into pixel grids having a predetermined size; aggregating data available in the database for each of the pixel grids; employing the objective function to calculate a region, such as an optimal pixel-grid linked region, for the optimization of the objective function; extracting entities, appearing on the map, that correspond to the obtained region, such as the optimal linked region; and employing the extracted entities to output a region that is applied for the map.

The entities included on a map correspond to the objects depicted thereon, such as roads, rivers, lakes, parks, forests and administrative districts.

At the step of dividing the region into the pixel grids, the predetermined size is determined based on the accuracy of the calculation and a calculation time. That is, it is preferable that to increase the accuracy of the calculation a method for the further division of pixel grids be employed, and that roughly-divided pixel grids be employed to reduce the time required for the calculation. Further, at the step of calculating the region of the pixel grid for the optimization of the objective function, the region is calculated based on the objective function and a limitation that are defined. For the optimization of the region, the limitation can be the minimum number of customers, or the number of pixel grids, if the region is so divided.

At the step of extracting the geographical entities, an entity that corresponds to an external frame for an obtained pixel grid is extracted based on a distance from the external frame and an angle relative to the external frame. It is preferable that an entity be eliminated that has a large angle relative to the external frame, and that, in spite of being positioned only a short distance from the external frame, is determined to be less relevant to the external frame.

In addition, at the step of outputting the region, a region wherein entities are connected is displayed on the map, a preferable form that is provided for a user. And it should be further noted that the region need not always be output with the map, and that a representation employing only words can be used.

According to another aspect of the present invention, a region calculation method for introducing a two-dimensional association rule extracted from a database, which includes spatial information, such as addresses, comprises the steps of: defining an objective function used to introduce the two-dimensional association rule; entering data from the database that includes the spatial information, such as address information, and other attributes; aggregating the data to calculate a region, which matches the objective function, for the optimization of the objective function; entering geographical information; employing the geographical information to extract entities appearing on a map, such as roads, rivers and borders between districts and coast lines; selecting, from the entities, proposed regional edges corresponding to the obtained region; and displaying the proposed regional edges that are reflected in the geographical information.

At the step of selecting the proposed regional edges, the entities are cut and facilitate the selection of the proposed region edges, and at the step of displaying the proposed regional edges, which are reflected on the map, the proposed regional edges are linked together for display on the map. Further, when a "whisker" (a dead-end folded line that extends from an intersection of multiple entities) is present in the entities that are cut, the "whisker" is removed and an unwasteful closed region is formed. Then, an output can be provided for a user that is easy to see and that is visually appealing.

At the step of displaying the proposed regional edges that are reflected on the map, the proposed regional edges on the display are enhanced by coloring external frames, thick lines and closed regions. Thus, an output that is easier to see can be provided for a user.

Furthermore, to achieve the above objects, according to an additional aspect of the present invention, a spatial data mining apparatus for introducing a two-dimensional association rule extracted from a database, which includes spatial information, such as addresses, comprises: definition means, for defining an objective function that is used to evaluate the two-dimensional association rule; input means, for entering geographical information; division means, for employing the geographical information to divide a region on the map into pixel grids having a predetermined size; data aggregation means, for extracting data from the database and for aggregating data for each of the pixel grids obtained by the division means; grid region calculation means, for employing aggregates to calculate the region of a pixel grid that optimizes the objective function; entity extraction means, for employing the geographical information to extract entities depicted on a map; proposed edge selection means, for selecting, from among the entities, proposed regional edges that correspond to the region obtained by the grid region calculation means; and output means, for employing the proposed regional edges to output a region corresponding to the geographical information.

The proposed edge selection means selects, as proposed edges, entities lying within a predetermined distance of the external frame of the region obtained by the grid region calculation means. The region within the predetermined distance can be, for example, a region that include the external frame of the region obtained by the grid region calculation means.

The spatial data mining apparatus further comprises: connection means, for employing an interpolation function to connect the proposed edges selected by the proposed edge selection means.

According to a further aspect of the present invention, a geographical information display apparatus comprises: data input means, for receiving data from a database in which data are stored that include attribute information associated with spatial information, such as addresses; geographical information input means, for entering geographical information, such as road information, that includes entities depicted on a map; objective function definition means, for defining an objective function that is used for evaluating a region; aggregate means, for employing the objective function to obtain an aggregate for the data entered by the data input means; selection means, for employing the aggregate obtained by the aggregate means to select a specific entity from among the entities input by the geographical information input means; and display means, for displaying a map using the geographical information, and for enhancing and displaying the entity selected by the selection means. The display means selects, from among the entities, a plurality of effective proposed edges formed of predetermined line segments, and links the effective proposed edges that are displayed.

According to a still further aspect of the present invention, a spatial data mining system comprises: a database in which data are stored that include attribute information associated with spatial information, such as addresses; a geographical information memory in which geographical information, such as road information, is stored that includes entities depicted on a map; an input device, for inputting an objective function to be requested for analyzation; aggregate means, for receiving data from the database and for aggregating the data based on the objective function; selection means, for receiving a predetermined entity depicted on the map from the geographical information memory, and for employing the aggregate obtained by the aggregate means to select a specific entity from among the entities; adjustment means, for adjusting the specific entity; and a display device, for displaying, together with the map stored in the geographical information memory, information for the specific entity that has been adjusted. The database and the geographical information memory are stored, for example, in a location separate from the display device, or on the hard disk drive of a computer that applies this method, or on a CD-ROM.

According to one more aspect of the present invention, a storage medium is provided on which a program is stored, based on an objective function for which regional information is not provided, to introduce a predetermined region extracted from a database that includes spatial information, such as addresses, the program comprising the steps of:

obtaining data from the database; aggregating the data to calculate a pixel linked region for the optimization of the objective function; entering geographical information; employing the geographical information to extract entities depicted on a map; selecting, from among the extracted entities, proposed regions that correspond to the pixel linked region; and outputting the selected proposed regions that are reflected in the geographical information. The storage medium is, for example, a portable storage medium such as a CD-ROM, another storage medium, such as a hard disk to which a program provider downloaded the program via a network, or the hard disk of a user who downloaded the program.

At the step of calculating the pixel linked region for optimization of the objective function, a region on the map is divided into pixel grids having a predetermined size, and the data for each of the pixel grids are aggregated. Thus, the accuracy of the calculation can be increased, and a shorter time will be required for the output of the results.

[Preferred Embodiment]

The preferred embodiment of the invention will now be described in detail while referring to the accompanying drawings.

FIG. 1 is a schematic diagram for explaining a computer system that, according to the embodiment of the invention, implements an optimal region calculation method. The processing algorithm for this embodiment is contained in a program that is executed by a computer system shown in FIG. 1. The processing program is stored on a hard disk drive (HDD) 15, and is loaded into a main memory 12 whereat it is executed by a CPU 11. This processing program is then used to access a large database, which is also recorded on the HDD 15, in which are stored data that are used as geographical information for a GIS (Geographical Information System) screen, special data for geographical entities depicted on a map, such as lakes, seas, forests, roads and rivers, address information, and customer data, consisting of the total value of recorded sales and annual income information.

The geographical information for the GUI screen and the results obtained by a calculation performed for an optimal region are provided for a user on a display device 16. While the user, to enter an objective function or a data output instruction, can employ an input device 17, such as a keyboard or a mouse, a pointing device, or a digitizer. Output results can be stored on a floppy disk in a floppy disk drive (FDD) 13, an auxiliary storage device that can also be used for the loading of new data. In addition, a CD-ROM drive 14 can be employed for loading geographical information and data that are stored on a CD-ROM.

The computer program that implements the processing algorithm of this embodiment can also be stored on a storage medium, such as a floppy disk or a CD-ROM, that can be transported by a user. In this case, the data extraction section of an ordinary database search program, or a program provided only for the display of data on the display device 16 may be stored in advance on the HDD 15. Therefore, using various types of storage media for the distribution of other sections is normal. Further, a communication device (not shown) may be connected to a bus 18, so that a remote database can be employed to perform the processing, or so that processing results can be transmitted to a remote area. That is, a large database in which spatial information, such as addresses, is stored can also be provided outside the configuration shown in FIG. 1.

FIG. 2 is a flowchart showing the processing performed to implement the optimal region calculation method that is employed for this embodiment, and that is mainly performed by the CPU 11. First, the geographical data are read from a memory medium, such as the HDD 15, and are formed into buckets spaced at equal intervals or at data count w intervals relative to the geographical information (step 101). Then, customer data are read from the memory medium, such as the HDD 15, the buckets are sorted (step 102), and a data aggregate is prepared for each bucket (step 103). Following this, a regional extraction engine consisting of an algorithm for obtaining an objective grid region calculates the best region for the optimization function that is obtained from an objective function value (e.g., the total sales of a specific product or the number of crimes that were committed) that a user entered using the input device 17 (step 104). The optimization function is, for example, an entropy function, a GINI index, a $\chi$ square, or a mean squared error.

Next, the calculation of an adjacent pixel region, such as the designation of the width of an adjacent pixel region, is performed (step 105). Thereafter, geographical data are read from the memory medium, such as the HDD 15, to extract geographical entities that intersect adjacent pixels (step 106). Then, "proposed effective edges" are selected from the extracted line segments (hereinafter referred to as "proposed line segments") (step 107). Thereafter, the line segments for the discontinuous "proposed effective edges" intersect each other (step 108), and "whiskers", which are removed, dead-end folded lines, are extended outward from the intersecting line segments (crossed line segments) (step 109). The thus obtained results can be displayed with the geographical information on the display device 16.

FIGS. 3A and 3B are diagrams showing an example customer database loaded on the HDD 15, and example limitation and objective functions that are entered by the input device 17. In an example customer database (DB) for a department store that is shown in FIG. 3A, customer data are stored based on individual attributes, customer IDs, names, addresses, values of recorded sales and annual incomes. In FIG. 3B, a limitation and an objective function are created for a region that is defined using an attribute associated with the spatial information defined in the database.

FIGS. 4A and 4B are diagrams showing the map read at step 101 in FIG. 2 and example buckets on the map. The GIS data for the map shown in FIG. 4A are stored on the HDD 15, and when the map is read, an appropriate distance can be determined. Then, as is shown in FIG. 4B, a pixel grid, which is applied to the map for use as a calculation scale, is formed of unit squares whose sides correspond to predetermined distances. The size of a pixel grid is determined depending on a desired calculation accuracy, and by a tradeoff with the calculation time. That is, when a large pixel grid is used, the calculation accuracy is reduced while the calculation time is increased, and when a small pixel grid is used, the calculation accuracy is increased while the calculation time is reduced.

FIG. 5 is a diagram showing example data aggregated for the buckets in the pixel grid at step 103 in FIG. 2. At step 102 in FIG. 2, the index values of the buckets that correspond to the coordinate values of the input records are allocated for the individual records, and based on the results, data are aggregated for each bucket. In this case, the database is scanned once, and the information required for the calculation of the above limitation and the objective function is aggregated for each pixel. For the two limitations and the two objective functions shown in FIG. 3B, the number of grid squares (the number of w pixels), as limitations, and the number of customers for each pixel, the total of the values of recorded sales and the sum of the annual incomes, as the objective functions, are aggregated. The aggregate results, as is shown in FIG. 5, are represented by using bucket numbers [i, j] for i rows and j columns ([0, 0], [0, 1], . . . [2, 0] . . . ), the number of pertinent customers (the number of input records) and the sum of the annual incomes. The aggregate results are stored on the HDD 15 or in the main memory 12, and in order to quickly obtain these results, it is preferable that the information for the individual vertical and horizontal pixels be managed using a tree structure. That is, when pixel information is managed by using a binary tree to determine a pixel whereat a bucket is located, even in the worst case the data can be aggregated within a calculation time that is proportional to the depth of the tree.

FIGS. 6A and 6B are graphs showing the calculation of the best region for the optimization value. That is, these graphs are used to explain an example region extraction engine at step 104 in FIG. 2. An arbitrary continuous grid region, which is formed on a pixel grid on the map for which an aggregation has been completed at step 103, can be featured as a point on the two-dimensional plane that is the sum of the aggregate values for the individual pixels. For example, an arbitrary region can be characterized by "the number of customers in a region; the sum of the annual incomes in the region" or "the number of grid squares; the sum of the sales in the region". While a region extraction engine is described in detail in Japanese Patent Application No. Hei 09-034605 by the present applicant, a brief description of this engine will be given here.

In FIG. 6A, the above described characteristic, "the number of customers in the region; the sum of the annual incomes in the region", is represented by using the horizontal axis as the number of customers in the region, and the vertical axis as the average annual income in the region. The minimum number of customers shown on this graph is the limitation used for region optimization. In FIG. 6B, the characteristic, "the number of grid squares; the sum of the sales in the region", is represented by using the horizontal axis as the number of grid squares and the vertical axis as the sum of the sales in the region. The maximum number of grid squares is the limitation for the regional optimization. All the regions constitute a set of points in the plane that is defined by two attribute values, such as "the number of customers in the region; the sum of the annual incomes in the region", that are aggregated for the individual pixels. The points present in the convex envelope of the set of points can be calculated quite quickly. That is, the points in the convex envelope can be regarded as the intersection of a tangent having a specific inclination θ and the convex envelope. In FIG. 6A, the points are calculated by using for the tangent a straight line that is located to the right of the number of the minimum number of customers that constitutes the limitation and that has the maximum inclination. In FIG. 6B, the points are calculated by using for the tangent a straight line that is located to the left of the number of the maximum number of grids that is the limitation and that has the minimum inclination. For an N^2 pixel grid located at N horizontally and N vertically, the intersection (tangent) can be calculated within a time $O(N^2)$ in the X monotonous region, or a time $O(N^3)$ in the orthogonal convex region. In this manner, when the method for obtaining the intersection between the convex envelop and the tangent having a specific inclination θ is repetitively employed, a grid region closest to the optimal objective region can be quickly obtained. When a plurality of regions are to be obtained, and the second and the third regions are to be calculated, the Y values of the individual pixels included in the region that has already been acquired are replaced with the values that act negatively to the objective function, and the same process can be performed for these values.

FIG. 7 is a diagram showing an optimal pixel grid region that is thus obtained. The region inclosed by a thick line in FIG. 7 is extracted by using the above described processing, and is used as a pixel grid area 31 that is the most suitable for the optimization function.

FIG. 8 is a diagram showing the calculation results obtained for the adjacent pixel regions at step 105 in FIG. 2. The regions sandwiching the edge, which is the external frame of the pixel grid region 31, are calculated, and a shaded, adjacent pixel region 32 is obtained. At this time, the number of pixels used to sandwich the edge, which is the external frame, may be designated by a user employing the input device 17.

FIGS. 9A and 9B are diagrams for explaining the extraction of geographical entities that intersect adjacent pixels at step 106 in FIG. 2. As is shown in FIG. 9A, for the geographical entities (lakes, seas, forests, rivers, roads, administrative districts, etc.) that are represented by polygons and folded lines on the map, the line segments inside the pixel grid region 31 are extracted as entity line segments 33. Then, in FIG. 9B, the extracted entity line segments 33 are cut, and proposed line segments 34 are extracted.

FIG. 10 is a diagram showing the results obtained by selecting the proposed effective edge at step 107 in FIG. 2. In this embodiment, the proposed effective edge 35 is selected from the proposed line segments 34 in FIG. 9B.

The proposed effective edge 35 is so selected from among the proposed line segments 34, that it can effectively serve as the edge of the final region. More specifically, from among the proposed line segments 34 that are present in the unit pixels of the adjacent pixel area 32, the edge that is nearest the unit grid edge that forms the pixel grid region 31 is selected as the proposed effective edge 35.

FIG. 11 is a flowchart showing the processing for selecting the proposed effective edge 35. First, proposed edges in the two pixels that sandwich the grid edge are selected (step 201). When the proposed edges are folded lines, a single line segment for minimizing the square error between the individual vertexes is used to obtain an approximate value (step 202). As a result, the proposed edges are all single line segments. Then, the edges forming angles relative to the grid edge that are equal to or smaller than 45 ° are extracted (step 203). The angle between the line segment of the grid edge, $(x_{s1}, y_{s1})$–$(x_{t1}, y_{t1})$, and the line segment of the proposed edge, $(x_{s2}, y_{s2})$–$(x_{t2}, y_{t2})$ is obtained by using an expression in the flowchart (step 204). This expression is used to indicate that as the value grows smaller the two line segments become nearly parallel. The distance between the middle point of the proposed edges and the grid edge is calculated as a numerical value that employs the pixel size as a unit (step 205). The angle and the distance are appropriately weighted, and a smaller resultant value is determined as the proposed effective edge 35 for the unit grid (step 206). Finally, the proposed edges that are only approximate are returned to the original folded lines (step 207). As is described above, the proposed effective edge 35 is obtained while taking into account not only the nearness to the grid edge but also the degree of the inclination. That is, if the inclination is large, it is determined that the proposed edge is not relevant, regardless of whether the edge is near the grid edge, and if the proposed edge is located along the line, this edge is selected as the proposed effective edge 35, regardless of whether it is farther from the grid edge.

FIG. 12 is a diagram showing an example wherein the line segments of the proposed effective edge 35 are linked at step 108 in FIG. 2. The line segments shown as broken lines 36 are the linked line segments that are added. While the proposed effective edge 35 is obtained for each grid unit, in many cases the effective edges obtained for continuous grid units are not continuous. That is, there are cases where discontinuous proposed effective edges 35 are selected, and cases where corresponding proposed effective edges 35 are not present. For the discontinuous proposed effective edges 35, linking line segments 36, which are obtained using an interpolation function, are used to connect the discontinuous proposed effective edges 35 and the effective edges 35 that next appear.

FIG. 13 is a diagram for explaining the removal of whiskers at step 109 in FIG. 2. When the proposed effective edges 35 have been linked using the linking line segments 36, they form a polygon. However, a polygon that is thus obtained still has "whiskers" 37, as is shown in FIG. 13. The whiskers 37 are dead-end folded line extensions of line segments that cross each other. These whiskers 37 can be removed by obtaining the crossed portion using an intersection enumeration algorithm, such as the plane scanning method, and by examining the connection as it is related to the intersection.

FIG. 14 is a diagram showing the thus obtained region that is output in consonance with geographical entities. The pixel grid region 31 in FIG. 7 is adjusted so that it corresponds to the actual geographical entities, and in FIG. 14 is converted into an adjusted region 38. This region 38 is reflected on the map presented on the display device 16. That is, enhancement processing using colors, such as red, or a thick line, or by coloring an adjusted, closed region or using monotone inversion is performed for the entities, such as road information, that are extracted and adjusted and for the linking line segments 36. The results are output on the map presented on the display device 16.

As is described above, in this embodiment, higher-level spatial data mining can be provided while taking into account the spatial continuity of regional optimization. Further, a pixel grid can be used to reduce the calculation time, and the output can be adjusted by using geographical entities, so that an easy to use spatial data mining system can be provided. For example, when this system is employed by a supermarket for an application used to obtain an optimal region for the distribution with newspapers of fliers, an optimal region can be output that takes into account such geographical entities as rivers, roads and parks. Then, when this output is used to prepare instructions for newspaper delivery contractors designating areas for the distribution of fliers, an efficient circulation effort can be mounted that can provide highly profitable results.

ADVANTAGES OF THE INVENTION

As is described above, according to the present invention, an objective function is provided that does not require the inclusion of regional information to furnish as output, based on a large database, optimized information for an area. Further, the optimized information can be adjusted so that it corresponds to actual geographical entities, and the obtained information can be output with the map.

BRIEF DESCRIPTION OF THE DRAWINGS

FIGS. 3A and 3B are diagrams showing an example customer database stored on an HDD 15, and example limitations and objective functions that are entered by an input device 17.

FIGS. 4A and 4B are diagrams showing a map that is read at step 101 in FIG. 2 and buckets for the map.

DESCRIPTION OF THE SYMBOLS

Figure 1:
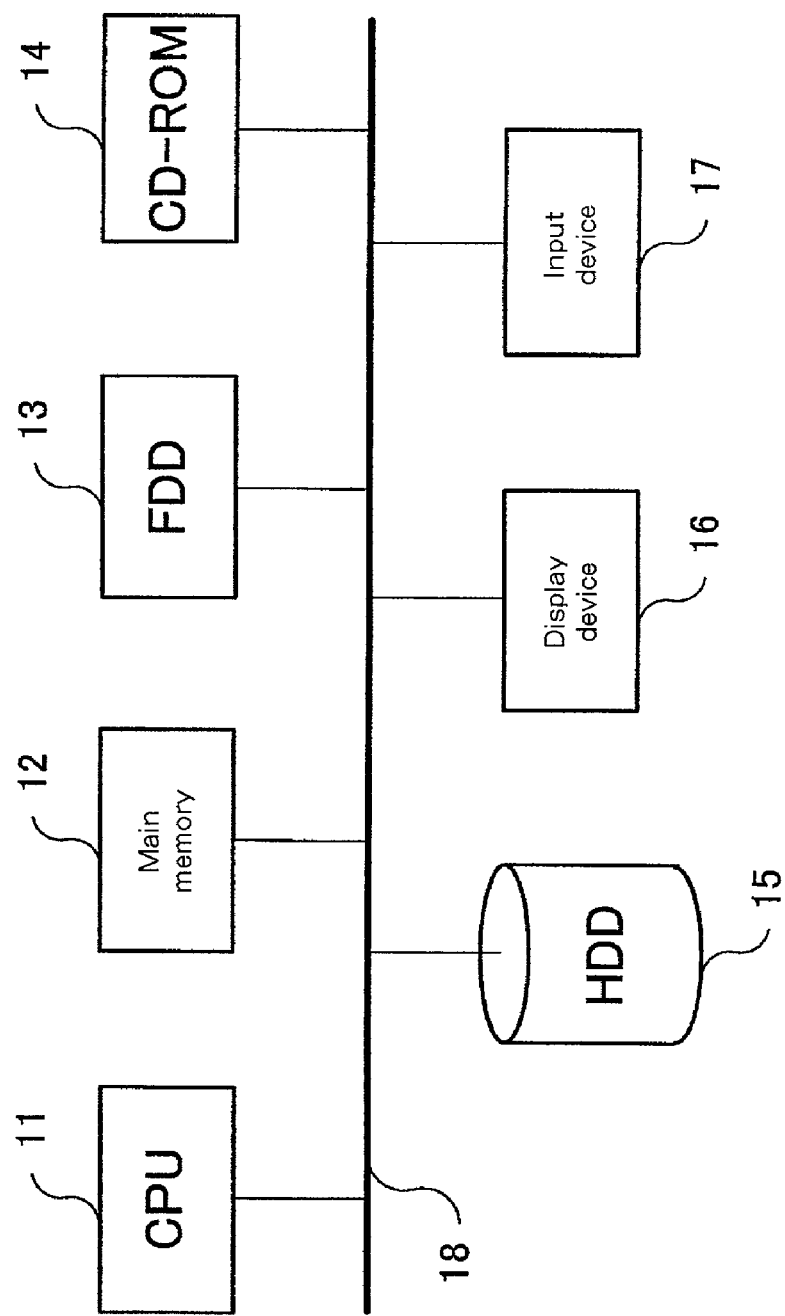
FIG. 1 is a schematic diagram for explaining the w configuration of a computer system for implementing an optimal region calculation method according to one embodiment of the present invention.
Figure 2:
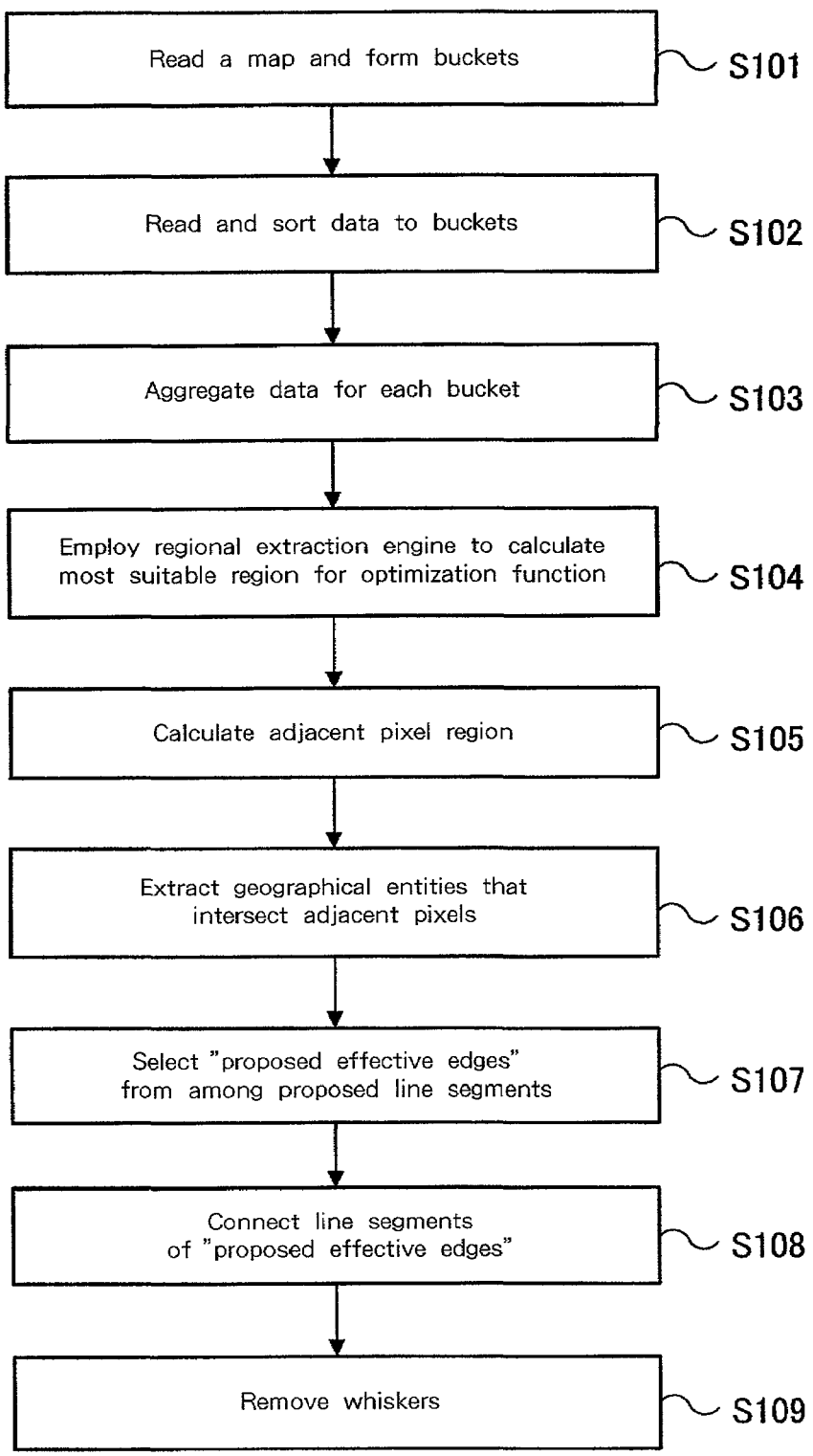
FIG. 2 is a flowchart showing the optimal region calculation method according to the embodiment.
Figure 5:
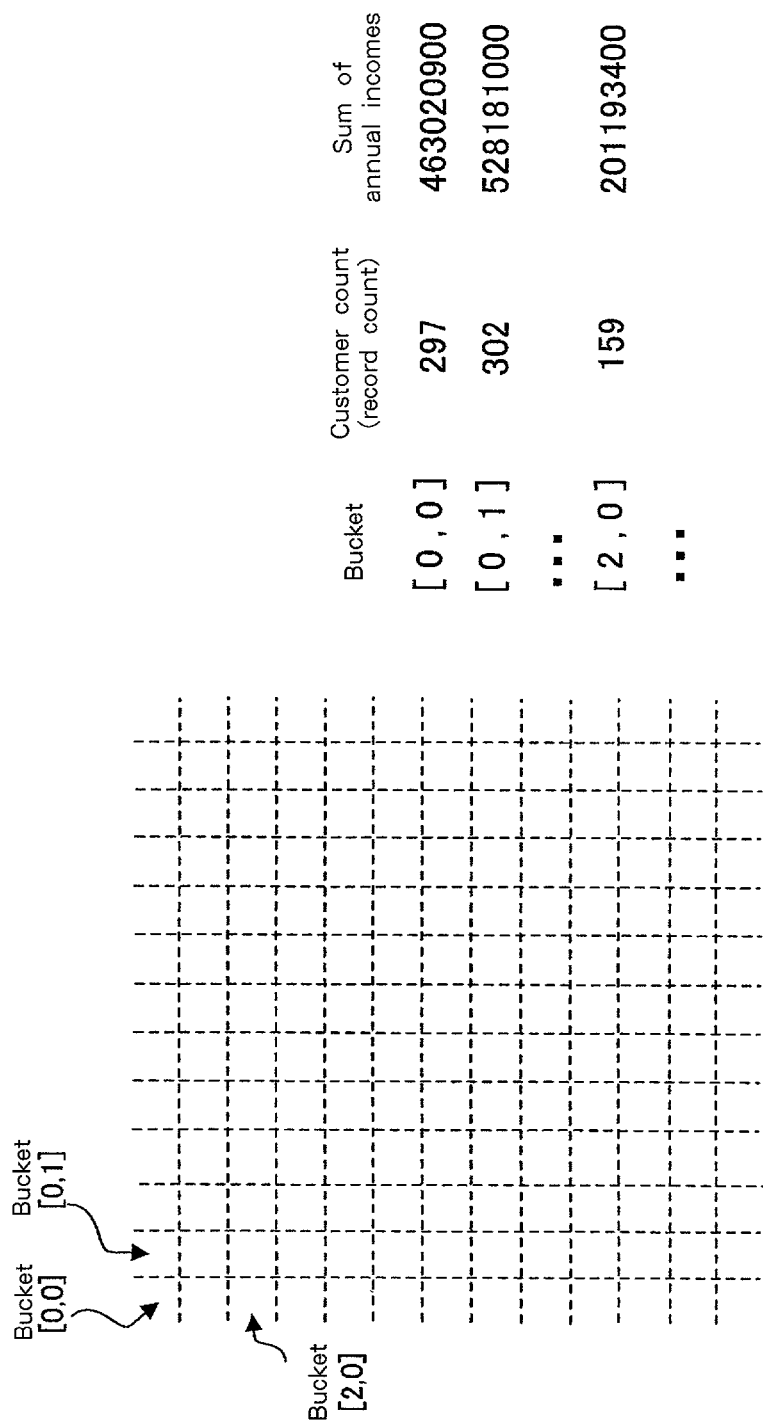
FIG. 5 is a diagram showing data that are aggregated for the buckets in a pixel grid at step 103 in FIG. 2.
Figure 6:
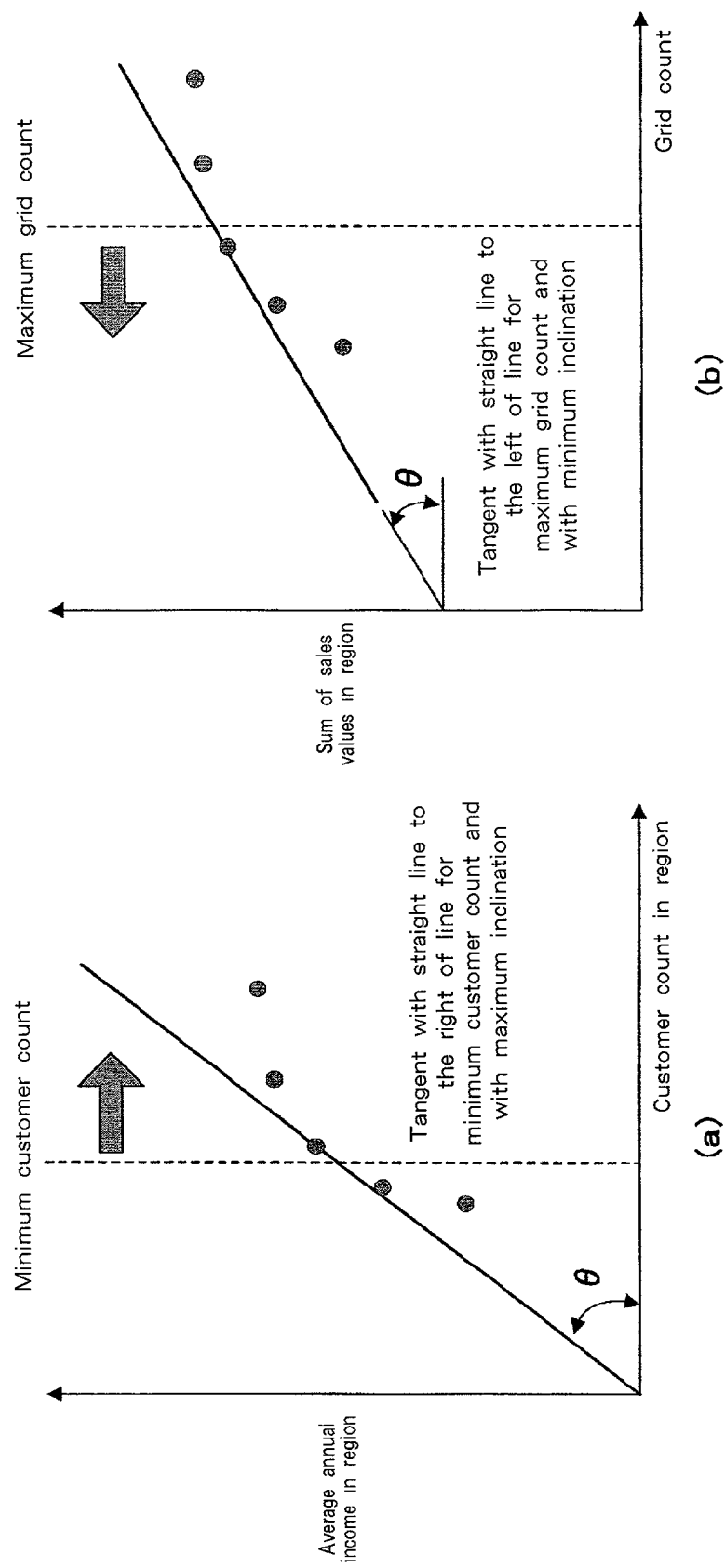
FIGS. 6A and 6B are diagrams showing the calculation performed for a region that is the most suitable for an optimization function value.
Figure 7:
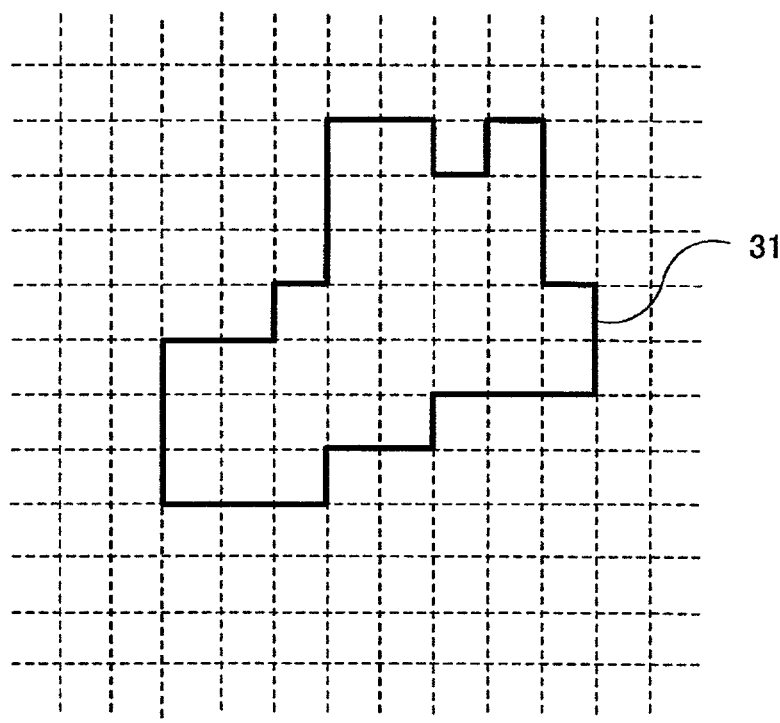
FIG. 7 is a diagram showing an optimal pixel grid region obtained by the calculation.
Figure 8:
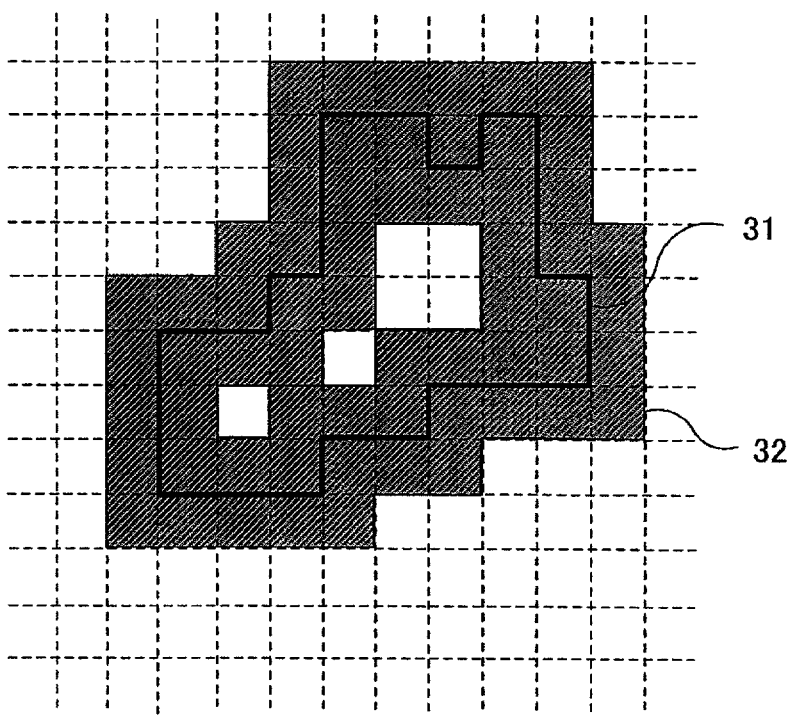
FIG. 8 is a diagram showing the result of the calculation of an adjacent pixel region 32 at step 105 in FIG. 2.
Figure 9:
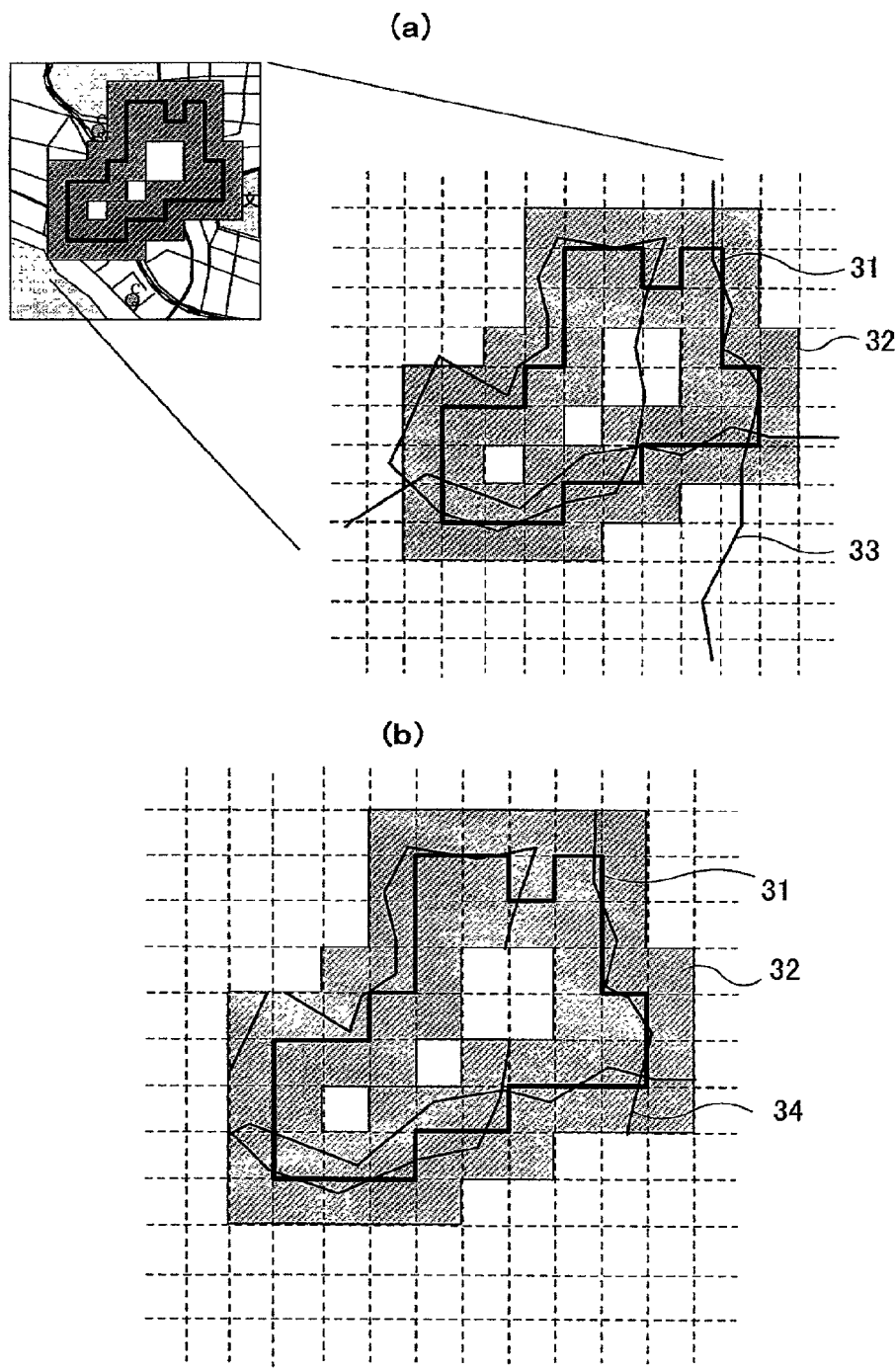
FIGS. 9A and 9B are diagrams for explaining the extraction of geographical entities that intersect adjacent pixels at step 106 in FIG. 2.
Figure 10:
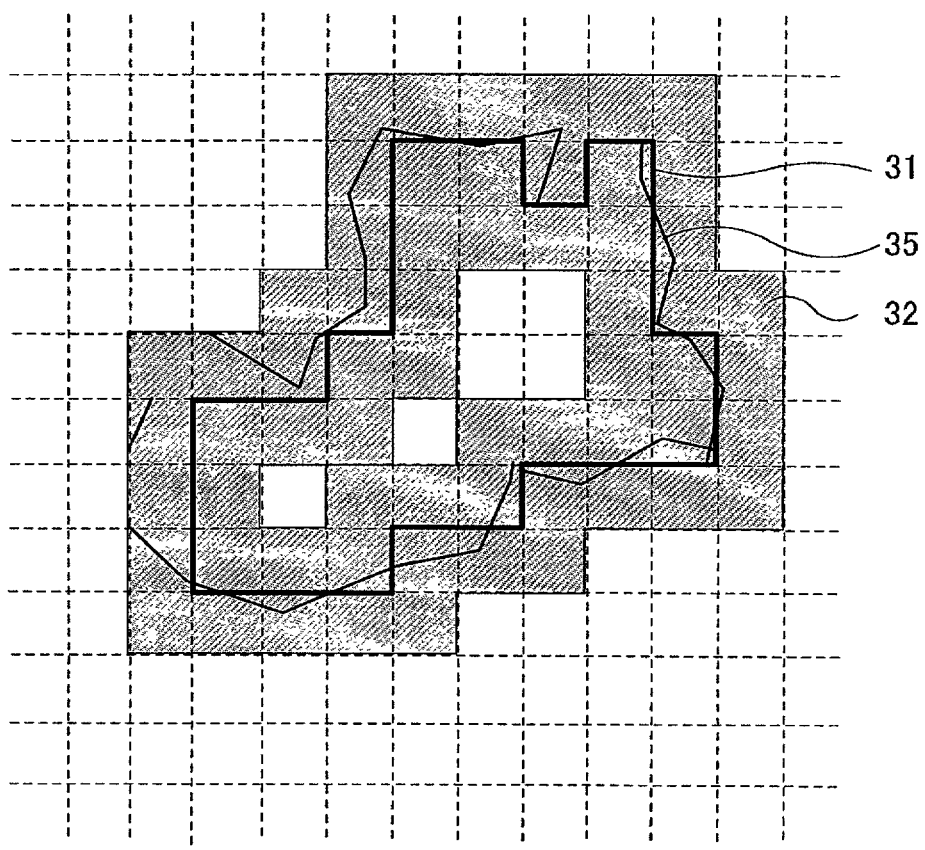
FIG. 10 is a diagram showing the results obtained by selecting the proposed effective edges 35 at step 107 in FIG. 2.
Figure 11:
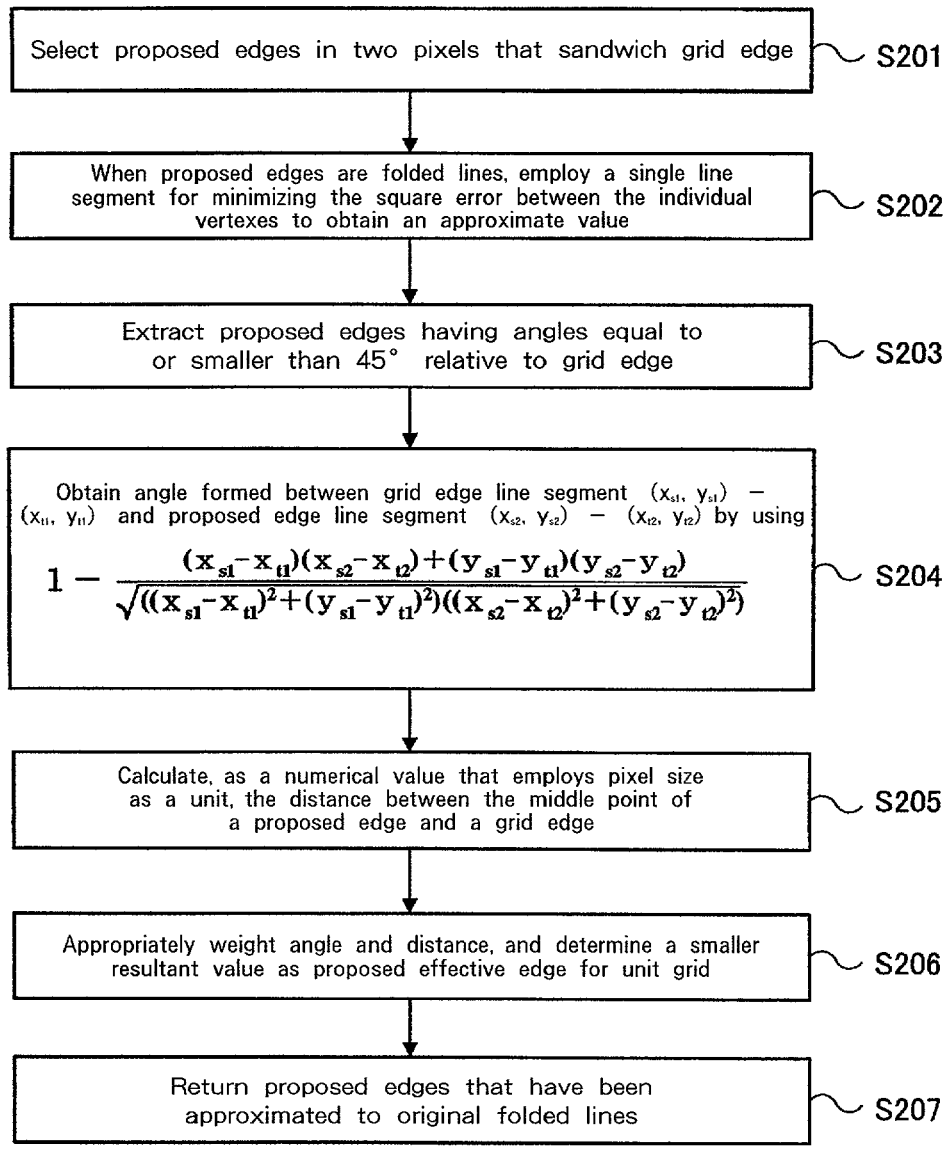
FIG. 11 is a flowchart showing the processing performed for selecting proposed effective edges 35.
Figure 12:
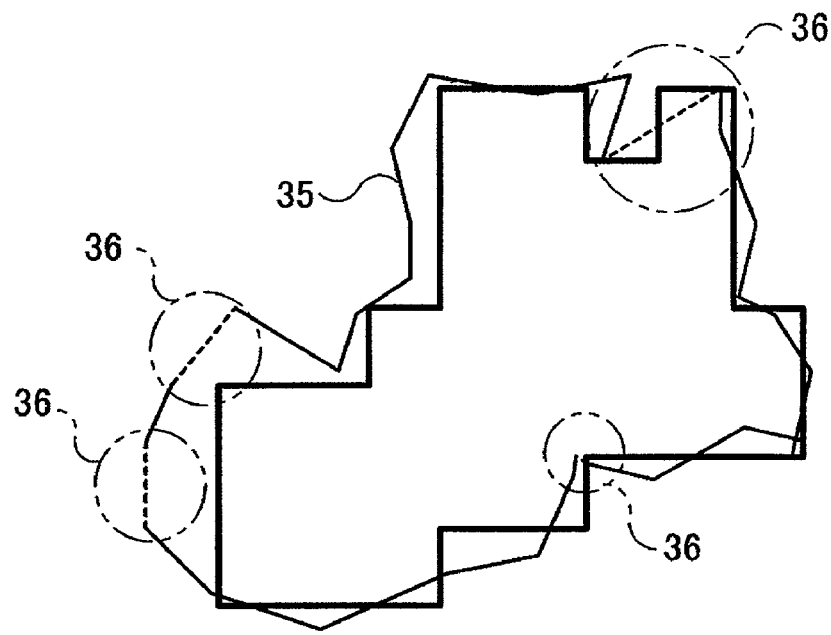
FIG. 12 is a diagram showing the connection of line segments of the proposed effective edges 35 at step 108 in FIG. 2.
Figure 13:
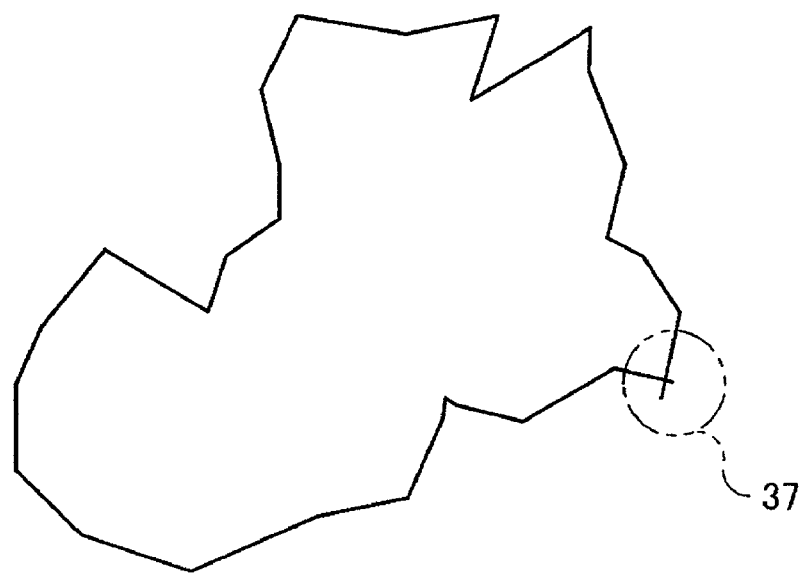
FIG. 13 is a diagram for explaining the removal of whiskers 37 at step 109 in FIG. 2.
Figure 14:
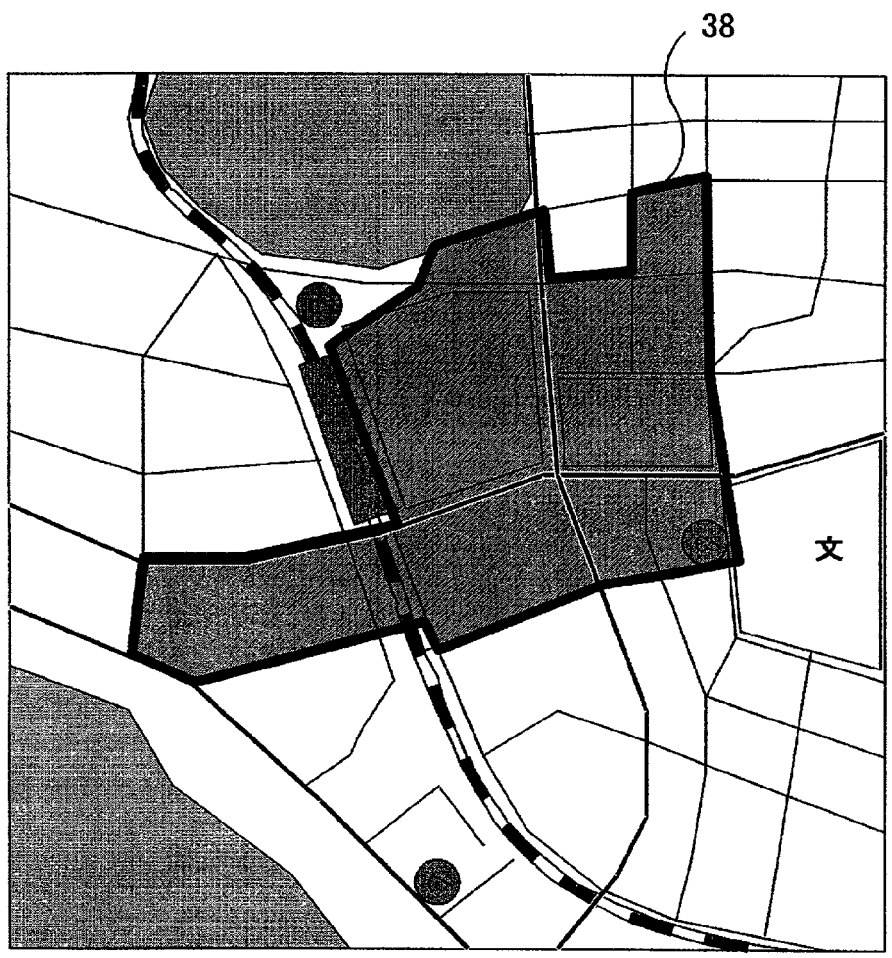
FIG. 14 is a diagram showing an example wherein an obtained region is output in accordance with geographical entities.

11: CPU
12: Main memory
13: Floppy disk drive (FDD)
14: CD-ROM drive
15: Hard disk drive (HDD)
16: Display device
17: Input device
18: Bus
31: Pixel grid area
32: Adjacent pixel region
33: Entity line segment
34: Proposed line segment
35: Proposed effective edge
36: Linked line segment
37: Whiskers
38: Adjusted region

The invention claimed is:

1. A region calculation method for introducing a two-dimensional association rule, extracted from a database, that includes spatial information, such as addresses, and for applying said two-dimensional association rule for a map, comprising the steps of:
   defining an objective function that is used to introduce said two-dimensional association rule;

dividing a region on said map into pixel grids having a predetermined size;

aggregating data available in said database for each of said pixel grids;

employing said objective function to calculate a region for each of said pixel grids;

extracting entities, appearing on said map, that correspond to said obtained region; and employing said extracted entities to output a region that is applied for said map.

2. The region calculation method according to claim 1, wherein said objective function does not include regional information for which an output request has been submitted.

3. The region calculation method according to claim 1, wherein, at said step of dividing said region into said pixel grids, said predetermined size is determined based on the accuracy of the calculation and a calculation time.

4. The region calculation method according to claim 1, wherein, at said step of calculating said region of said pixel grid for the optimization of said objective function, said region is calculated based on said objective function and a limitation that are defined.

5. The region calculation method according to claim 1, wherein, at said step of extracting said geographical entities, an entity that corresponds to an external frame for said pixel grid is extracted based on a distance from said external frame and an angle relative to said external frame.

6. The region calculation method according to claim 1, wherein, at said step of outputting said region, a region wherein entities are connected is displayed on said map, a preferable form that is provided for a user.

7. A region calculation method for introducing a two-dimensional association rule extracted from a database, which includes spatial information, such as addresses, comprising the steps of:

defining an objective function used to introduce said two-dimensional association rule;

entering data from said database that includes said spatial information;

aggregating said data to calculate a region for the optimization of said objective function;

entering geographical information;

employing said geographical information to extract entities appearing on a map;

selecting, from said entities, proposed regional edges corresponding to said obtained region; and displaying said proposed regional edges that are reflected in said geographical information.

8. The region calculation method according to claim 7, wherein said entities on said map are road data.

9. The region calculation method according to claim 7, wherein, at said step of selecting said proposed regional edges, said entities are cut and facilitate the selection of said proposed region edges; and wherein, at said step of displaying said proposed regional edges, which are reflected on said map, said proposed regional edges are linked together for display on said map.

10. The region calculation method according to claim 7, wherein, at said step of displaying said proposed regional edges that are reflected on said map, said proposed regional edges are enhanced to be displayed on said map.

11. A spatial data mining apparatus for introducing a two-dimensional association rule extracted from a database, which includes spatial information, such as addresses, comprising:

definition means, for defining an objective function that is used to evaluate said two-dimensional association rule;

input means, for entering geographical information;

division means, for employing said geographical information to divide a region on said map into pixel grids having a predetermined size;

data aggregation means, for extracting data from said database and for aggregating data for each of said pixel grids obtained by said division means;

grid region calculation means, for employing aggregates to calculate the region of a pixel grid that optimizes said objective function;

entity extraction means, for employing said geographical information to extract entities depicted on a map;

proposed edge selection means, for selecting, from among said entities, proposed regional edges that correspond to said region obtained by said grid region calculation means; and output means, for employing said proposed regional edges to output a region corresponding to said geographical information.

12. The spatial data mining apparatus according to claim 11, wherein said proposed edge selection means selects, as proposed edges, entities lying within a predetermined distance of said external frame of said region obtained by said grid region calculation means.

13. The spatial data mining apparatus according to claim 11, further comprising:

connection means to connect said proposed edges selected by said proposed edge selection means.

14. A geographical information display apparatus comprising:

data input means, for receiving data from a database in which data are stored that include attribute information associated with spatial information, such as addresses;

geographical information input means, for entering geographical information, such as road information, that includes entities depicted on a map;

objective function definition means, for defining an objective function that is used for evaluating a region;

aggregate means, for employing said objective function to obtain an aggregate for said data entered by said data input means;

selection means, for employing the aggregate obtained by said aggregate means to select a specific entity from among said entities input by said geographical information input means; and display means, for displaying a map using said geographical information, and for enhancing and displaying said entity selected by said selection means.

15. The geographical information display apparatus according to claim 14, wherein said display means selects, from among said entities, a plurality of effective proposed edges formed of predetermined line segments, and links said effective proposed edges that are displayed.

16. A spatial data mining system comprising:

a database in which data are stored that include attribute information associated with spatial information, such as addresses;

a geographical information memory in which geographical information, such as road information, is stored that includes entities depicted on a map;

an input device, for inputting an objective function to be requested for analyzation;

aggregate means, for receiving data from said database and for aggregating said data based on said objective function;

selection means, for receiving a predetermined entity depicted on said map from said geographical information memory, and for employing the aggregate obtained by said aggregate means to select a specific entity from among said entities;

adjustment means, for adjusting said specific entity; and a display device, for displaying, together with said map stored in said geographical information memory, information for said specific entity that has been adjusted.

17. A storage medium on which a program is stored, based on an objective function for which regional information is not provided, to introduce a predetermined region extracted from a database that includes spatial information, such as addresses, said program comprising the steps of:

obtaining data from said database;

aggregating said data to calculate a region for the optimization of said objective function;

entering geographical information;

employing said geographical information to extract entities depicted on a map;

selecting, from among said extracted entities, proposed regions that correspond to said region; and outputting said selected proposed regions that are reflected in said geographical information.

18. The storage medium according to claim 17, wherein, at said step of calculating said region for optimization of said objective function, a region on said map is divided into pixel grids having a predetermined size, and the data for each of said pixel grids are aggregated.

* * * * *